May 12, 1970 J. W. BURD 3,511,723

METHOD FOR PRODUCTION OF EPITAXIAL FILMS

Filed Dec. 16, 1966 3 Sheets-Sheet 1

INVENTOR
JOHN W. BURD
BY
Robert J. Schaap
ATTORNEY

May 12, 1970 J. W. BURD 3,511,723

METHOD FOR PRODUCTION OF EPITAXIAL FILMS

Filed Dec. 16, 1966 3 Sheets-Sheet 2

INVENTOR
JOHN W. BURD

BY Robert J. Schaap

ATTORNEY

INVENTOR
JOHN W. BURD
BY Robert J. Schaap
ATTORNEY 3,511,723
METHOD FOR PRODUCTION OF EPITAXIAL FILMS John W. Burd, Chesterfield, Mo., assignor to Monsanto Company, St. Louis, Mo., a corporation of Delaware
Filed Dec. 16, 1966, Ser. No. 602,242
Int. Cl. H01l 7/36
U.S. Cl. 148—175 7 Claims

ABSTRACT OF THE DISCLOSURE

The method of producing a semiconductor material by depositing an epitaxial coating on a semiconductor-type substrate. An epitaxial reaction gas is introduced to a first zone which is maintained at a temperature within the range of 400–1100° C. The reaction gas which is preferably formed from a III–V compound is introduced into a second zone where it is contacted with a suitably employed dopant. The temperature in the second zone is raised substantially above the temperature in the first zone to within a range of 500° C. to 1200° C. Thereafter, the reaction gas with the dopant is introduced into a third zone or isothermal zone where the temperature is lowered to a temperature within the range of 400° C. to 1100° C. The substrates are rotated in said isothermal zone with respect to the entering stream of gas and dopant so that the gas and dopant move uniformily over the substrates to cause an epitaxial film in the gas to be deposited on the substrates which are located in the isothermal zone.

This invention relates in general to the production of semiconductor materials, and more particularly to an improved method and apparatus for the production of epitaxial films of large single crystals.

A large number of problems have been encountered in the growing of epitaxial crystals of a semiconductor for diverse electronic applications. These problems are generally more severe in those areas which employ a ternary system. Generally, the production of semiconductor devices must be performed under the most carefully controlled conditions. The rate of crystal growth must be controlled exactly to insure a desired and uniform epitaxial layer. Moreover, the reactant composition and reaction conditions must be stabilized to attain uniform composition of the mixed crystal. Utmost purity of the semi-conductor is necessary which necessitates starting materials of the highest purity and reaction conditions which insure a minimum of contamination. It is also necessary to have controlled and uniform doping of the crystals over wide ranges of doping levels.

The technique of epitaxial deposition for binary and ternary systems involves thermally reversible reactions in a carrier gas. In the region of the source material, the equilibrium of the reversible region is toward the more volatile constituents of the system and is thermally shifted toward the less volatile constituents in the region of the substrates. Thus, semiconductor material is transported from the source region and is deposited on a substrate. When the substrate is a single crystal, the same crystalline orientation and the periodicity of the substrate is maintained. This technique is practiced both in sealed or so-called "closed" systems and in systems involving a steady flow of reactant gas.

The majority of the current reactors for the production of the epitaxial films to be used in the manufacture of semiconductor devices are of the so-called "open-tube" design in which the reaction gases flow into one end of a reactor tube, through the tube, and exit from the opposite end thereof. The flow rates are sufficiently low to be classified as laminar-flow. Upon entering the reaction tube, the reactant gas mixture first encounters a source material at a relatively high temperature where the source may be converted to a volatile halide and another volatile constituent. The halide is generally a Group III halide and the volatile constituent is generally a Group V element. This mixture then passes along the reaction tube to the region of the wafer substrates at a relatively lower temperature. The reactant mixture becomes saturated with respect to the quantity of the volatile Group III halide and the Group V constituent and epitaxial deposition occurs on the substrate wafers. However, the wafers are generally longitudinally aligned with respect to the entering reactant gases and as soon as deposition occurs on the first wafer in the path of the gas, the composition of the gas stream is altered. Therefore, the thermodynamic driving force of the reaction is different with respect to subsequent wafers in the downstream position.

In order to overcome the change of composition with respect to subsequent wafers in the stream of the gas, alteration of the temperature should occur along the length of the reaction tube so that those wafers at the distal end of the tube with respect to the entering reactant gases would have a lower temperature than the wafers or substrates which were located at the proximate end of the tube. However, this type of temperature gradient is difficult to maintain accurately and reproducibly in order to compensate for the depleted reactants in the stream of gas. Consequently, uniform growth rate and, therefore, thickness control from wafer to wafer was poor. Furthermore, the variation in gas composition and deposition temperatures with substrate position introduces variations in compositions for ternary alloy systems and in impurity concentration from wafer to wafer. Consequently, it was often very difficult to maintain composition and desired doping levels in each of the epitaxial films.

It is, therefore, the primary object of the present invention to provide apparatus and method for producing epitaxial films on single crystal structures.

It is another object of the present invention to provide an apparatus and method of the type stated which overcomes the non-uniformity of conventional film deposition by controlling crystal growth to insure a desired and uniform epitaxial layer.

It is a further object of the present invention to provide an apparatus and method of the type stated where reactant composition and reaction conditions are stabilized to attain a uniform composition of mixed crystal.

It is also another object of the present invention to provide an apparatus and method of the type stated where controlled and uniform doping of the crystals is achieved over a wide range of doping levels.

It is another salient object of the present invention to produce an apparatus of the type stated which can be economically constructed, and a method of the type stated which can be performed in a minimal amount of time.

With the above and other objects in view, our invention resides in the novel features of form, construction, arrangement and combination of parts presently described and pointed out in the claims.

In the accompanying drawings:

FIG. 1 is a vertical sectional view showing in side elevation an apparatus for the production of epitaxial films constructed in accordance with and embodying the present invention;

FIGS. 2 and 3 are vertical sectional views taken along lines 2—2 and 3—3, respectively of FIG. 1;

Figure 8:
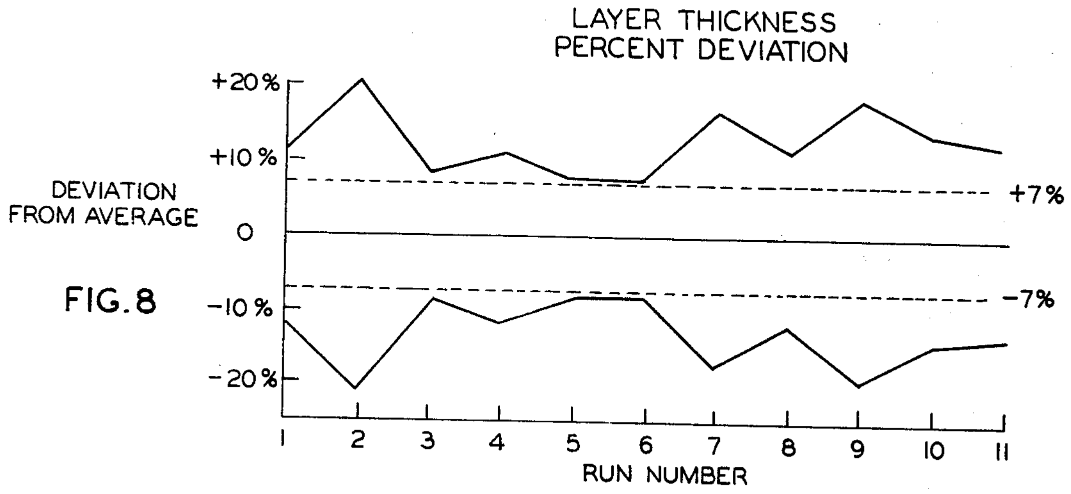
Figure 9:
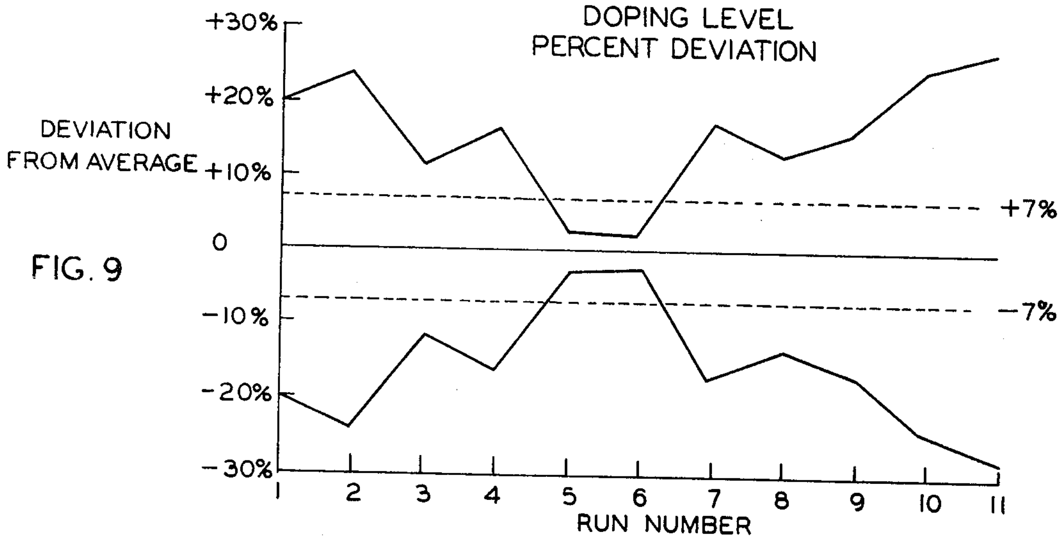

FIG. 8 is a graphic illustration showing the percentage of deviation from a normal value of layer thickness by devices constructed in accordance with prior art methods and devices constructed in accordance with the present invention; and FIG. 9 is a graphic illustration showing the percentage of deviation from a normal value of doping level by devices constructed in accordance with prior art methods and devices constructed in accordance with the present invention.

GENERAL DESCRIPTION

Generally speaking, the present invention relates to a modified form of open ended epitaxial deposition reactor. The reactor is subdivided into three chambers which also serve as three temperature zones. For the purposes of the present invention, the first chamber generally serves as a reaction chamber, the second chamber generally servse as a mixing chamber and the third chamber serves as a deposition chamber. The reactant gas mixture used in the reactor of the present invention can be prepared in any of a number of conventional ways. One of the preferred methods used in the practice of the present invention is the introduction of a reactant gas preferably containing a Group V halide into the reaction chamber where it reacts with a source material preferably containing a Group III element. This source material is then converted to a volatile Group III halide and the volatile Group V element. This mixture is then passed into the mixing chamber where a dopant may be admixed with the reactant gas.

The deposition chamber is preferably an isothermal chamber and is designed so that each of the wafers disposed therein is directly located in the stream of entering gas. The substrate holder is preferably in the shape of a regular octagon having a flat bottom wall which is slightly annularly spaced from the interior of the deposition chamber. Furthermore, a plurality of eight side walls converge inwardly and upwardly to an apex which is in direct alignment with a gas port formed in the wall separating the deposition chamber and the mixing chamber. It should be recognized that the substrate holder is not limited to the shape of a regular octagon and a holder with any number of side walls may be employed. The gases enter into the deposition chamber through this port, preferably at a laminar flow and are spread evenly across all of the eight faces of the substrate support. A ledge is provided on each of the eight walls for holding the wafers disposed thereon. Furthermore, the substrate support is rotated at a relatively low rate of speed in order to obtain uniform heat distribution and thermal symmetry across each of the wafers. The discharge tube is also connected to the deposition chamber for removal of the spent gases in the deposition chamber. A three zone furnace surrounds the reactor and provides the desired temperature conditions in each of the three zones.

The previously described reactor is a vertically disposed reactor where the reaction chamber is located at the upper end and the deposition chamber is located at the lower end. It is also possible to provide a horizontally disposed reactor substantially similar to the previously described vertical reactor. However, in the horizontal reactor a slightly different type of wafer support is provided. In this latter modification, a series of forks are provided so that either one or a pair of wafers may be disposed between each of the forks. Again, the forks are connected to a shaft which is powered by a conventional motor for rotating the forks and the wafers disposed thereon.

These types of reactors uniquely lend themselves to the preparation of multilayer structures which are required in one continuous operation. This type of continuous operation for preparing multiconfigurations is preferred over a stepwise method where layers of one conductivity type are grown in one operation and where layers of different conductivity types are grown in another operation.

DETAILED DESCRIPTION

Figures 1, 2, 3:
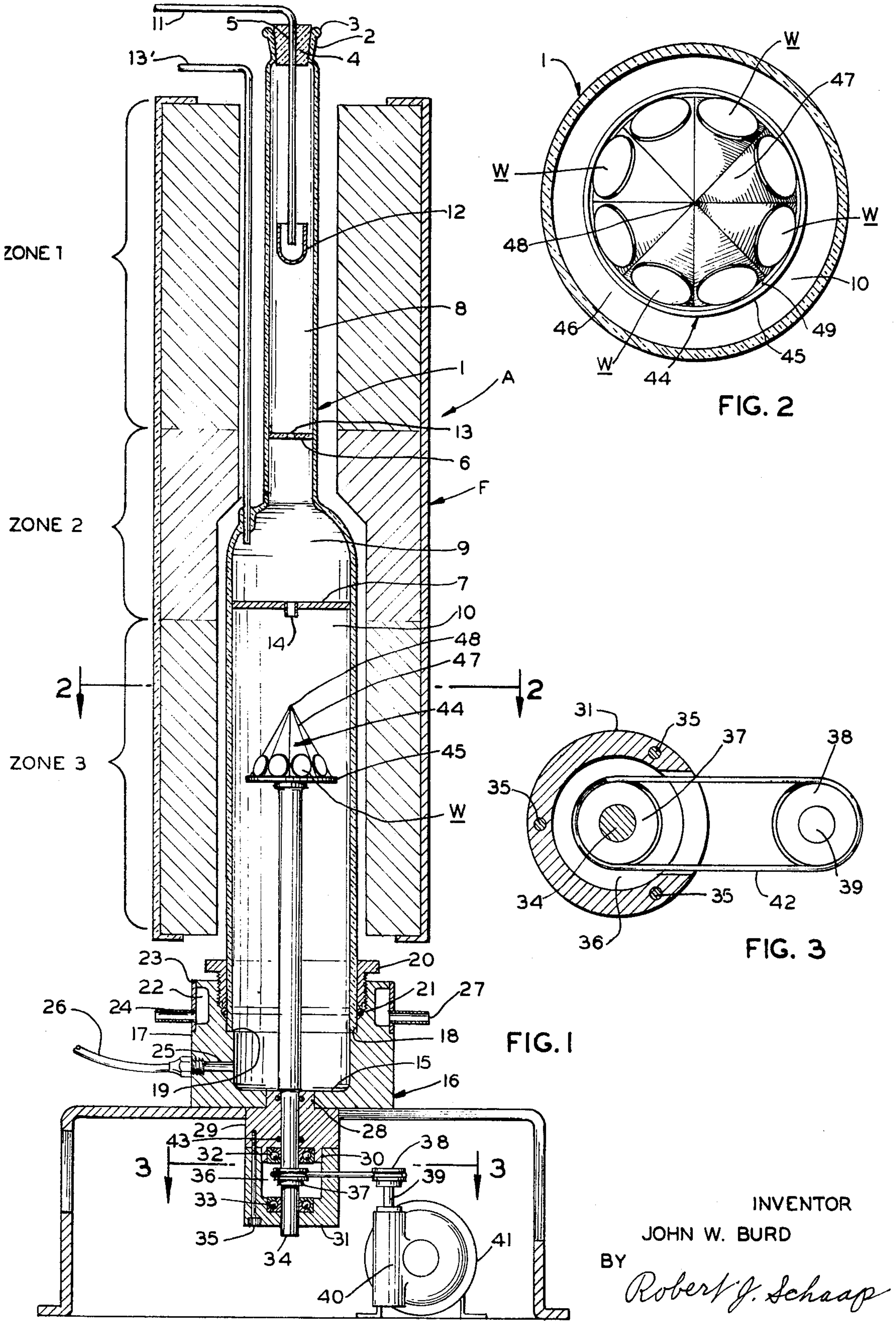

Referring now in more detail and by reference characters to the drawings which illustrate practical embodiments of the present invention, A designates an apparatus for the production of epitaxial deposition films and generally comprises a vertically disposed reaction vessel or tube 1 which is preferably constructed of quartz or any other gas-tight material which is capable of withstanding the high temperature of operation, which is inert to the gaseous reactants, and which does not emit impurities at such temperatures. Other suitable materials are boron nitride, a refractory aluminum oxide and similar refractory materials. The reaction vessel is schematically illustrated in FIG. 1 and is flared outwardly in the provision of a tapered upper end 2, with an annular flange 3 for accommodation of an end plug 4, the latter having an aperture 5. The reaction vessel 1 is also provided intermediate its ends with a pair of axially spaced discs 6, 7 thereby dividing the reaction vessel 1 into a reaction chamber 8, a mixing chamber 9 and a deposition chamber 10.

The reaction chamber 8 or the upper chamber, reference being made to FIG. 1, is provided with a gas inlet tube 11 which extends through the plug 4 and terminates above a container 12 of source material which is preferably a Group III element, such as gallium. The feed gas admitted through the tube 11 is a halogen-containing gas and preferably a chlorine-containing gas in the form of hydrogen chloride, phosphorus trichloride or arsenic trichloride, for example. The feed gas may contain the Group V element and reacts with the source material to form a volatile Group III halide. The epitaxial growth of III–V compounds is based on the departure of the equilibrium of a reversible reaction between the Group III halides and Group V elements such as for example:

$$3GaCl+\tfrac{1}{2}As_4 \rightleftarrows 2GaAs+GaCl_3$$

The basic principle of the transfer reaction is that the equilibrium shifts towards the left with increasing temperature and towards the right with decreasing temperature. This reaction is surface catalyzed by seed crystals so that deposition occurs on seed crystals more readily than on surrounding surfaces at the same temperatures. It should be understood that the present invention is not limited to this reaction described above.

The reactant gases are then passed into the mixing chamber 9 through a port 13 formed in the disc 6. Also entering the mixing chamber 9 and terminating in close proximity to the terminal end of the discharge port 13 is a dopant feed tube 13'. Any conventional doping material may be used and may be introduced by any conventional means. For example, the dopant may be introduced in elemental form or as a volatile compound of the dopant element. The quantity of dopant employed is generally controlled by the electrical properties desired in the final product. Suitable amounts contemplated herein are those sufficient to produce concentrations in the range approximately from $1\times10^{15}$ to $5\times10^{20}$ atoms per cubic centimeter of product.

As an alternative to the process of introducing the Group V element with the feed gas into the reaction chamber in the manner described, the inlet gas may contain only the halide carrier in the form of hydrogen and hydrogen halide. The halide carrier will then react with the Group III element in the container 12 forming a volatile Group III halide. The Group V element containing gas is then admitted to the mixing chamber 9 with the dopant through the tube 13'. The gas carrying the volatilized Group III element will then mix with the gas containing the Group V element in the mixing chamber 9.

It has been found to be desirable to employ a chloride transport system in the practice of the present invention. This system is far preferable to systems which employ an oxide intermediate as the oxide systems generally require higher temperatures than a halide system. These higher temperatures increase the contamination through reaction of the volatile species with the reactor materials. Furthermore, appreciable amounts of undesired oxides may be incorporated in the epitaxial film when an oxide transport is employed. The other halides, such as bromides and iodides require lower deposition temperatures which may not be suitable in all cases and it has also been found that some substrate orientations do not grow suitably in iodide or bromide systems. However while chlorides present the preferable transport media, it should be recognized that the other halides may be used in most cases.

The reactants gases which have been thoroughly mixed in the mixing chamber 9 are then passed into the deposition chamber 10 through an inlet port 14 formed in the disc 7. In my copending application Ser. No. 521,240, filed Jan. 3, 1966, the gas was admitted to the deposition chamber at a relatively high velocity causing turbulence and rapid mixing in the deposition chamber. These velocities created in the deposition chamber were a wide departure from the laminar flows which were previously employed. However, through the structure of the present reactor, it is possible to again admit the reactant gases into the deposition chamber in the slower laminar flows. In fact, it is possible to admit the reactant gases into the deposition chamber at flow rates which range from 60 centimeters per second to 600 centimeters per second. The deposition chamber 10 is open ended at its lower end and fits within a drive housing 16, the latter being more fully illustrated in FIG. 1. The drive housing 16 generally comprises a supporting cup 17 having a bottom wall 15, an annular side wall 18 and an intermediate supporting shoulder 19. The lower end of the deposition chamber 10 is sized to fit snugly within the annular side wall 18 and rests against the intermediate supporting shoulder 19, in the manner as illustrated in FIG. 1. The interior surface of the annular side wall 18 is milled away along its upper end and is threaded to accommodate an upper gland nut 20. The gland nut 20 is also tapered at its lower end and is spaced from a matching taper on the side wall 18 for accommodation of an O ring seal 21, the latter preferably being formed of viton. The side wall 18 is further cut away in the provisions of a fluid duct 22 and covered by an annular sleeve 23. The sleeve 23 is integrally formed with an outwardly extending fluid port 24 for connection to a suitable source of cooling fluid (not shown). The side wall 18 is also provided with a discharge port 25, the latter connecting with a discharge pipe 26 secured to the lower end of the drive housing 16. In this manner, the spent gases from the deposition chamber 10 can exit through the discharge pipe 26 and through the discharge port 25 formed in the housing 16. The sleeve 23 is also provided with an outwardly extending fluid port 27 for discharge of the fluid which enters through the port 24.

The bottom wall 15 is centrally apertured to accommodate an upwardly extending box 28 formed on a bearing hub 29 in the manner as illustrated in FIG. 1. And bearing hub is also provided with a downwardly extending diametrally reduced box 30 for accommodating a bearing cap 31. The boss 30 and the bearing cap 31 are internally bored to accommodate conventional bearings 32, 33 for journaling a vertical drive shaft 34. Furthermore, the bearing cap 31 is held rigidly in place and secured to the bearing hub 29 by means of a series of cap screws 35.

A central bore or relief 36 is formed between the lower end of the boss 30 and the bearing cap 31 and being disposed in the relief and also be operatively mounted on the shaft 34 for rotation therewith is a pulley 37. The pulley 37 cooperates with a similar pulley 38 operatively mounted on the upper end of a connecting shaft 39. At its lower end, the connecting shaft is, in turn, connected to a conventional speed reducer 40 which is, in turn, operable by a conventional electric motor 41. A drive belt 42 is trained around each of the cooperating pulleys 37, 38 in the manner as illustrated in FIGS. 1 and 3. Furthermore, it can be seen that the housing 16 serves as a mechanism for holding the reactor 1 in a substantially vertical upright position in the manner as illustrated in FIG. 1.

The bearing hub 29 is annularly grooved to accommodate a pair of vertically spaced sealing rings or so-called O rings 43. The upper end of the main drive shaft 34 extends upwardly into the deposition chamber 10. The drive shaft 34 is also preferably constructed of a quartz material or similar material which is inert to the reaction taking place in the deposition chamber or to any of the gases which are admitted to the deposition chamber. It is possible to construct the drive shaft 34 of a metal material up to the point where it enters the deposition chamber 10. At this point, a conventional coupling can be employed to connect a quartz extension to the lower end of the main drive shaft and where the quartz extension would extend upwardly into the deposition chamber 10.

At its upper end, a wafer support tray 44 is formed with or rigidly secured to the upper end of the main drive shaft 34. The wafer support tray 44 generally comprises a bottom plate 45 which is circular in horizontal cross section and is slightly spaced from the interior wall of the deposition chamber 10, thereby forming a gas passage 46 circumferentially therearound. The wafer support tray 44 is also in the form of a regular octagon having eight upwardly and inwardly converging side walls 47, which converge at an apex 48. The walls 47 are slightly spaced inwardly from the peripheral margin of the plate 45, thereby providing a ledge 49 at the base of each of the walls 47 for supporting a wafer *w* disposed thereon.

In essence, the rotating tray 44 also serves as an end wall in the deposition chamber 10 with an apex 48 directed toward the inlet port formed in the disc 7. The tray 44 is preferably rotated at a speed of approximately 10–15 r.p.m. In connection with the present invention, it has been found that the tray 44 should be rotated at a speed within the range of 10 r.p.m. and 15 r.p.m. The gases should be introduced into the deposition chamber 10 in a condition of laminar flow so that a condition of high turbulence is not created in the deposition chamber 10. The gas which enters the chamber 10 will move evenly at a relatively uniform rate of speed across each of the wafers *w* supported on the tray 44. Since all of the wafers are located in the same transverse plane with respect to the entering gas, substantially even deposition will occur across each of the wafers *w*. Furthermore, the gas which enters the chamber 10 will strike the apex and somewhat spread out so that it is evenly distributed across each of the side walls 47 and the wafers *w* supported thereon.

Since any portion of the gas stream contacts substrates in only one plane, the effect of changing gas composition from wafer to wafer in the prior art devices has been eliminated. Furthermore, a much shorter isothermal zone is required. For the purpose of the present invention, the substrate tray 44 is designed to hold 8 wafers with a maximum diameter of approximately 20 millimeters. The angle of inclination of the wafers from the vertical should be within 10° to 50° with a preferred angle of 30° with respect to the vertical.

Figure 7:
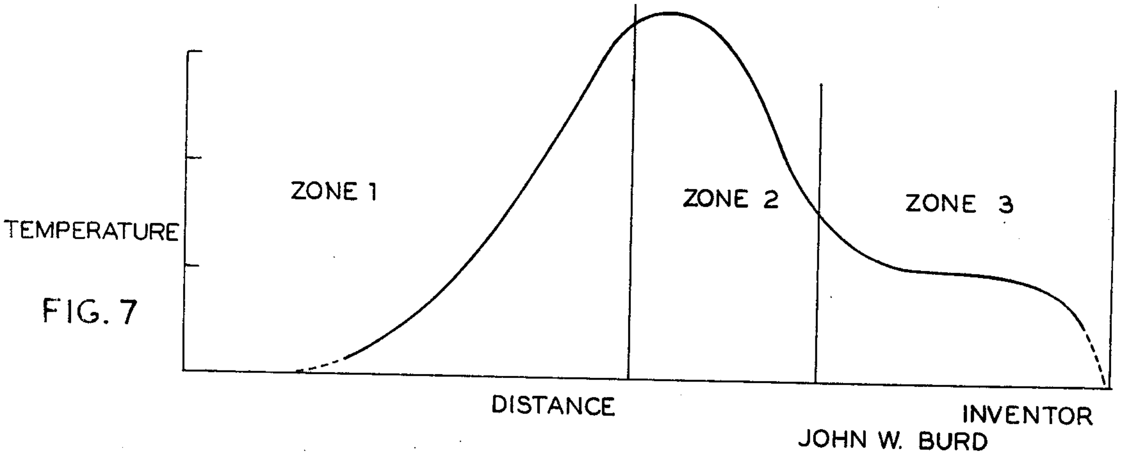
FIG. 7 is a diagrammatic view showing the temperature gradient employed across the apparatus of the present invention and the operation thereof.

A conventional three zone furnace F, preferably of the radiant energy type is disposed about the reaction vessel 1 in the manner as illustrated in FIG. 1. The furnace F is designed to produce a temperature gradient of the type illustrated in FIG. 7 across the reaction vessel 1. Thus, it can be seen that the temperature initially rises to the desired reaction temperature in zone 1, which is preferably in the range of 400° to 1100° C. Thereafter, the temperature is increased substantially to a temperature within the range of 500° to 1200° C. in the mixing zone or chamber 9. This higher temperature level is maintained substantially constant for the greater portion of zone 2. Thereafter, the temperature is markedly dropped in zone 2 immediately prior to the deposition zone or deposition chamber 10.

It is desirable, though not at all necessary, to maintain the entire deposition chamber 10 at an isothermal temperature for purposes of creating deposition of the epitaxial film on the wafers *w*. The isothermal temperature is preferably in the range of 400° to 1100° C. in order to produce the deposition of the epitaxial film in the deposition chamber 10. It should be understood that this temperature range is varied for the different compositions of the epitaxial film and for the different gas flow rates. As indicated above, the reaction is also surface catalyzed so that deposition occurs more readily on the wafers *w* than on the surrounding surfaces at the same temperatures. Furthermore, the gas phase mass transfer and crystallographic orientation also have significant effects on the deposition rate.

It can also be seen that the unique reactor design readily lends itself to an ability to prepare a multilayered structure in one continuous operation. As indicated previously, this type of operation for preparing the multilayer configuration is preferred over a stepwise method where layers of one conductivity type are grown in one operation and layers of a different conductivity type are grown in another operation. Such a "stepwise" procedure necessarily lengthens the production cycle and increases the probability of contamination of the grown layers. A stepwise method also adds difficulty in the controlled growing of the graded junction. In accordance with the procedures of the present invention, it is now possible to change doping agents by ceasing the flow of dopant into the mixing chamber, flushing the entire system with an inert gas such as hydrogen and changing dopant gases. The gas flows into the reaction vessel are maintained at sufficiently high velocity so that backflow into the source of the Group III element is prevented and contamination thereof is thereby prevented. Accordingly it is now possible to switch dopant gases without fear of contaminating the source of Group III material. This present method thereby avoids the difficulty previously employed in the stepwise growing of graded junctions.

It should also be recognized that this apparatus and method is particularly adaptable for use with gallium phosphide and gallium arsenide systems. If a gallium arsenide-phosphide epitaxial layer is to be formed on the wafer *w*, the reactant gases in the inlet tube 11 are preferably phosphorus trichloride, arsenic trichloride and hydrogen. Consequently, the dopant admitted in the dopant tube would contain pure hydrogen and would contain the dopant plus hydrogen. However, if the carrier gas is merely hydrogen and hydrogen chloride; phosphine, arsine, the hydrogen and dopant are added through the dopant tube 13'. In either case, gallium arsenide-phosphide alloy is formed and deposited on the wafers *w*.

It should also be recognized that epitaxial films formed in accordance with this invention comprise compounds formed from the elements of Group III–A of the periodic system and particularly those having atomic weights of from 10 to 119 and elements selected from Group V–B having atomic weights of from 12 to 133. Included in this group of compounds are the nitrides, phosphides, arsenides and antimonides of boron, aluminum, gallium and indium. The bismuthides and thallium compounds, while operable, are less suitable. In addition to the use of the above compounds by themselves, mixtures of these compounds are also contemplated as epitaxial films, e.g., aluminum nitride and indium antimonide mixed in varying proportions when produced by the instant process produce suitable semiconductor compositions.

Other combinations of elements within the above group which are contemplated herein include ternary and quaternary compositions, or mixed binary crystals, such as combinations having the formulae $GaAs_xP_{1-x}$, $InAs_xP_{1-x}$, $GaP_xN_{1-x}$, $AlP_xAs_{1-x}$, $Ga_xIn_{1-x}As$, $Ga_xIn_{1-x}P$, $In_xGa_{1-x}Sb$, $Ga_xAl_{1-x}P$, $Ga_yIn_{1-y}As_xP_{1-x}$ and $GaAs_x(P_yN_{1-y})_{1-x}$, where *x* and *y* have a numerical value greater than zero and less than one.

Materials useful as substrates herein include the same materials used in the epitaxial films as just described and, in addition, compounds of elements of Groups II and VI (II–VI compounds) and compounds of Groups I and VII elements (I–VII compounds), and the elements silicon and germanium are suitable substrates. Suitable dimensions of the seed crystal are 1 mm. thick, 10 mm. wide and 15–20 mm. long, although larger or smaller crystals may be used.

It should be appreciated that by following the teaching of this invention it is possible to form semiconductor bodies having a plurality of layers of differing conductivities, wherein the width of each layer may be precisely controlled. This allows the transition region or junction, if different type conductivity layers are involved, to be accurately positioned in the semiconductor body. It is also possible to provide in any layer formed, any variation in conductivity desired in any plane parallel to the transition region by varying the concentration of vapor source of active impurity atoms in the flow to the reaction chamber during formation of the layer. The benefits from flexibility of such controls, compared to prior art techniques for forming transition regions, are immediately apparent.

As illustrated by the devices shown, any desired type of semiconductor device may be made by utilizing the method of the present invention. In each case, the semiconductor device will include at least two layers of semiconductor material having different conductivities and separated by a transition region. In some instances, the transition region will be a P-N junction, while in other instances it may be a P-I or an N-I junction and in still other instances it may be a sharp transition region between layers of high and low resistivity material of the same conductivity type. It will be appreciated that where reference is made herein to different conductivities in layers in any assembly thereof, that the difference may be either in kind or in degree. In the case of a P-N junction, the layers separated thereby may have the same degree of conductivity (or resistivity) but the type of conductivity will, of course, be different. Alternatively, in the case of, for example, an N+-N transition region the conductivity type will be the same for the layers but the degree of conductivity will, of course, be different. In any case, however, the width of the layers of material and the location and type of the junction or transition region may be very accurately defined and controlled by the method of the present invention.

It should also be recognized that each of the discs 6, 7 can be replaced by glass frit discs (not shown) and which are sufficiently porous to permit the gas flow therethrough.

Figure 4:
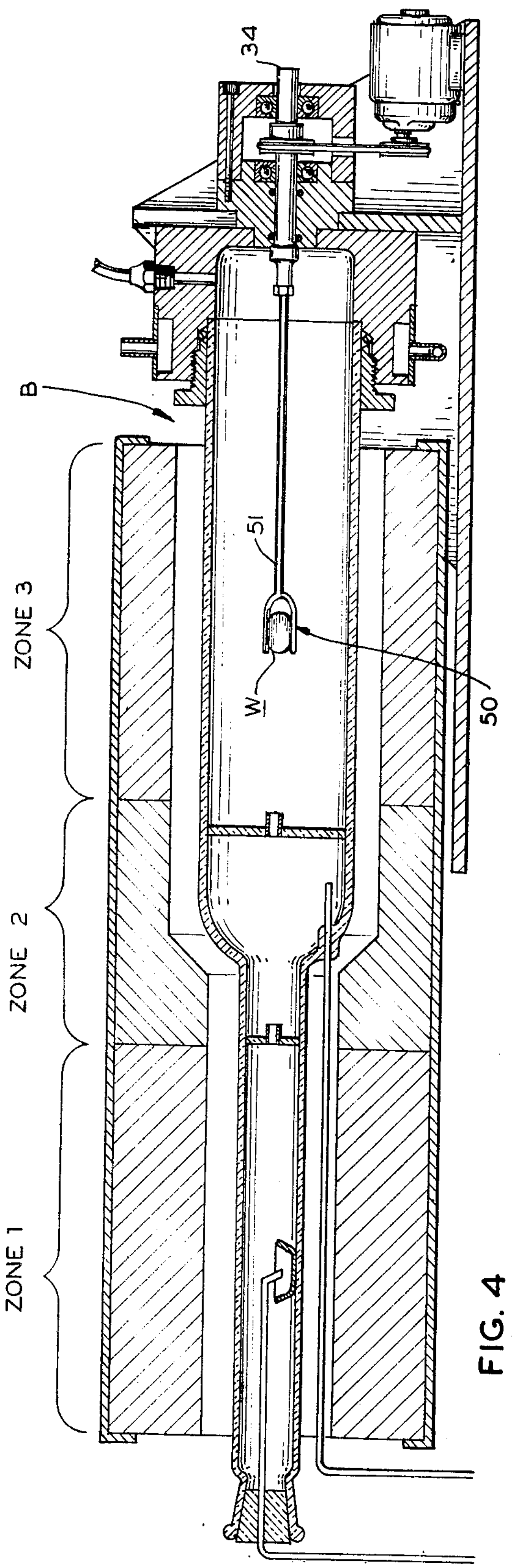
FIG. 4 is a vertical sectional view similar to the view of FIG. 1 and showing a modified form of apparatus constructed in accordance with and embodying the present invention.
Figures 5, 6:
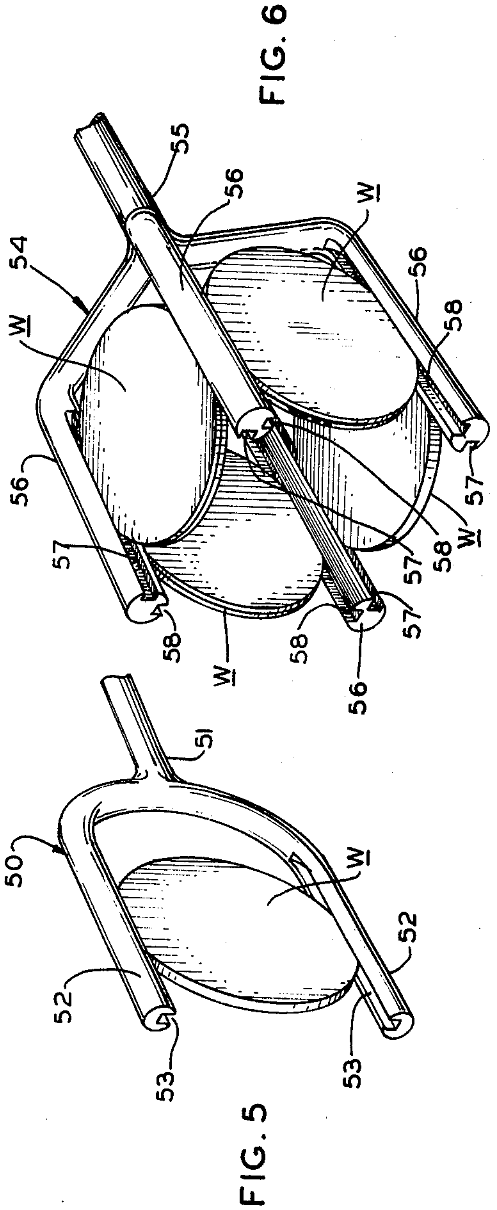
FIG. 5 is a perspective view of a wafer support tray forming part of the apparatus of FIG. 4.
FIG. 6 is a perspective view of a modified form of wafer support tray constructed in accordance with and embodying the present invention.

It is possible to provide a modified form of epitaxial deposition reactor B substantially as illustrated in FIGS. 4–6 and which is substantially similar to the previously described deposition reactor A. The reactor B, however, while substantially identical in almost all respects to the reactor A is horizontally disposed in the same manner as the reactor described in my copending application Ser. No. 521,240, filed Jan. 3, 1966. However, a substantially different type of deposition chamber is employed when compared to the deposition chamber described and illustrated in the aforementioned copending application.

In the epitaxial deposition reactor B a substrate holder or so-called "fork" 50 is secured to the inner end of the main drive shaft 34. Again, the substrate holder 50 may be integrally formed with the quartz shaft 34, or it may be secured to the upper end of a metal shaft in any conventional manner. The substrate holder 50 generally comprises a support shaft 51 which is integrally formed with a pair of spaced opposed outwardly extending fingers 52 in the manner as illustrated in FIG. 5. The fingers 52 are each provided with longitudinal slots 53 on their interior surface for accommodating wafers *w*. The slots may be sized to accommodate one wafer or they may be sized to accommodate a pair of wafers which are disposed in back-to-back relationship so that the bottom surface of each wafer is not exposed to the gas streams, that is, where the undersurface of each of the wafers is facewise disposed upon each other.

It is also possible to provide a modified form of substrate holder 54, substantially as illustrated in FIG. 6 and which is substantially similar to the previously described substrate holder 50. The substrate holder 54 includes a shaft 55 which integrally merges into four outwardly extending fingers 56. Each of the fingers 56 lies at the corners of and in effect forms a perfect rectangle. Furthermore, each of the fingers is spaced from the next adjacent finger by a distance substantially equal to the diametral size of a wafer *w*. Each of the fingers 56 is provided with pairs of slots 57, 58 which are located at 90° angles with respect to each other. Thus, one finger has a slot 57, which is aligned with respect to a similar slot 57 on an opposed finger 56. The first finger also has a slot 58 which is located at 90° with respect to the slot 57 and the latter slot 58 being opposed to a similar slot 58 formed in another finger being located at 90°. In this manner, it is possible to retain four wafers between each of the four fingers 56. It also should be recognized that the slots 57 may be made sufficiently large for accommodating a pair of wafers where the underside of each of the wafers is facewise disposed against each other in back-to-back relationship. It can be seen that this type of substrate holder permits gas flow along all surfaces of each of the eight wafers which are retained thereon and furthermore does not interfere with the gas flow in the reactor. It is within the scope of the present invention to provide substrate holders which employ more than four fingers so that a number of substrates greater than four can be retained at any one time.

It should be recognized in connection with the present invention that the epitaxial deposition reaction system B is as versatile as the previously described reaction system A and, furthermore, the various films which can be manufactured in the reaction system A can also be manufactured in the reaction system B.

EXAMPLES

The invention is further illustrated by but not limited to the following examples. These examples exemplify the difference existing between the epitaxial deposition reactor of the prior art and the procedures employed therein and the epitaxial deposition reactors of the present invention and the associated procedures. The first of the examples employs a so-called "open tube" of the prior art type and using prior art methods. The open tube reactor was employed in Example 1 to make an accurate comparison of the modified form of open tube reactor of the present invention, which is employed in the subsequent examples. A second example indicates the results achieved with a vertically disposed reactor, but where the substrate holder is rotated. Example 3 discloses the results achieved when the vertically disposed reactor of Example 2 was employed and when the substrate holder was rotated. Example 4 indicates the superior results achieved when a horizontally disposed reactor of the type disclosed herein is employed.

EXAMPLE 1

An epitaxial deposition open tube reactor of the prior art type made of quartz is used in this example. A radiant heater is disposed about the reactor and effectively subdivides the reactor into two temperature zones. Connected to one end of the reactor is a source of hydrogen chloride which is passed through a purification train. Also connected to the same end of the reactor is a source of hydrogen which is passed through a palladium purifier. Tellurium doped solid gallium arsenide is disposed in zone 1.

Hydrogen chloride and hydrogen gases are passed through these zones at a flow rate of approximately 100 cubic centimeters per minute. The reactor has an inner diameter of 20 millimeters and an overall length of 36". However, the effective length is only 28".

The substrates are gallium arsenide wafers which are oriented in the 1·0·0 plane (Miller Indices). The gases are passed through the reactor for approximately 20 minutes. The substrates are held at approximately 800° C. and the gallium arsenide source region is maintained at approximately 900° C. The deposition portion of the reactor is held to a 10° C. temperature decreasing gradient per inch. The net carrier level $n_d$ type is found to be between $5.2\times10^{16}/\text{cm.}^3 \leq n_d \leq 2.85\times10^{17}/\text{cm.}^3$.

Two wafers are employed in each run for this example and a series of 11 runs are conducted under the same conditions. The wafer on the proximate end is designated as the first wafer in Table 1 set forth below and the wafer on the distal end is designated as the second wafer. The thicknesses in microns of these layers are measured and tabulated in Table 1. The difference of the thicknesses, the averages and the deviation from the average are also calculated and set forth in Table 1. The percentage deviation from the average is plotted for each run in FIG. 8 and accordingly two curves showing plus and minus values as deviations from the average are plotted in solid lines. These curves show the wide deviation from a zero error value for each of the runs and the difficulty in achieving uniform thickness.

The dopant levels are also measured in each wafer and these data are set forth in Table 2. The difference between the dopant levels of each wafer in a run is calculated and tabulated in Table 2 and similarly the averages and deviations from the normal are also set forth in Table 2. These deviations are plotted in FIG. 9 and show the wide deviation of dopant levels from the normal.

TABLE 1.—LAYER THICKNESS DATA

| Run No. | 1st.-2nd. | Diff. | Avg. | Dev., percent |
|---|---|---|---|---|
| 1 | 6.0-7.5 | 1.5 | 6.75 | ±11.6 |
| 2 | 6.0-9.2 | 3.2 | 7.6 | ±21.0 |
| 3 | 5.5-6.5 | 1.0 | 6.0 | ±8.35 |
| 4 | 3.0-3.8 | 0.8 | 3.4 | ±11.75 |
| 5 | 5.0-5.9 | 0.9 | 5.45 | ±8.25 |
| 6 | 4.6-5.4 | 0.8 | 5.0 | ±8.0 |
| 7 | 3.6-5.1 | 1.5 | 4.35 | ±17.25 |
| 8 | 4.5-5.7 | 1.2 | 5.10 | ±11.75 |
| 9 | 3.8-5.6 | 1.8 | 4.7 | ±19.2 |
| 10 | 6.0-8.0 | 2.0 | 7.0 | ±14.3 |
| 11 | 4.4-5.7 | 1.3 | 5.05 | ±12.9 |

TABLE 2.—DOPING LEVEL DATA

| Run No. | Doping level ($\times10^{17}$) | Diff. | Avg. | Dev., percent |
|---|---|---|---|---|
| 1 | 1.72-1.15 | 0.57 | 1.435 | ±19.8 |
| 2 | 0.79-1.29 | 0.50 | 1.04 | ±24 |
| 3 | 1.9 - 2.4 | 0.50 | 2.15 | ±11.6 |
| 4 | 1.65- 2.3 | 0.65 | 1.975 | ±16.4 |
| 5 | 1.9 - 2.0 | 0.10 | 1.95 | ±2.6 |
| 6 | 2.85-2.78 | 0.07 | 2.82 | ±2.5 |
| 7 | 1.4 - 2.0 | 0.6 | 1.7 | ±17.6 |
| 8 | 2.0 - 2.6 | 0.6 | 2.3 | ±13.1 |
| 9 | 0.93- 1.3 | 0.37 | 1.11 | ±16.7 |
| 10 | 1.08- 1.8 | 0.72 | 1.44 | ±25 |
| 11 | 0.52- 0.92 | 0.40 | 0.72 | ±27.8 |

EXAMPLE 2

This example employs a vertically disposed epitaxial deposition reactor constructed in accordance with the present invention. The reactor vessel is divided into three chambers, namely a reacting chamber, a mixing chamber and a deposition chamber. The actual reactor tube was constructed of quartz and the left hand section of the tube was constructed of a 25 millimeter by 22 millimeter tubing and had a 29/42 T*s* joint at the open end. The length of the tube from the open end to the beginning of the mixing chamber was approximately 30 inches. A No. 1 porosity quartz frit was positioned at a distance 27 inches from the open end of the tube and served to inhibit back diffusion of Group V constituents and dopants into the source region. The gallium source material was situated upstream from the frit at a point corresponding to the proper temperature required for the type of source used, namely gallium metal. The next section or mixing chamber was approximately 3" long and the dimensions of the tube increased from 25 x 22 millimeters to 70 x 74 millimeters. The latter dimension continued for approximately 19 inches. A 7 x 9 millimeter addition tube extended along the 25 x 22 millimeter tube and entered the mixing chamber where the chamber diameter began to increase. The mixing chamber ended in a flat bulk head containing a quartz frit which served to uniformly distribute the reaction gas mixture in the deposition chamber.

concentrated sulfuric acid and 30% hydrogen peroxide against a flat Teflon block using the rotating beaker technique. After the chemical polish during which another 2 mils are removed the wafers are demounted from the polishing block, thoroughly cleaned with trichloroethylene and warm isopropanol and stored in a petri dish for subsequent use. Immediately prior to use the substrates are etched in a 5:1:1 solution of concentrated sulfuric acid, 30% hydrogen peroxide, and water. They are rinsed with pure water, warm isopropanol, and blown dry with a stream of pure nitrogen.

A solid gallium arsenide source material in the form of ⅛" cubes is located in the reactor chamber on the upstream side of a small diameter frit at a point corresponding to a temperature of approximately 900° C. A mixture of hydrogen chloride in hydrogen was passed over the source material at a linear velocity of approximately 1 centimeter per second to allow sufficient contact time and thereby obtain complete reaction between the hydrogen chloride and gallium arsenide. Additional purified hydrogen was fed through the Group V addition tube to bring the total gas flow to the required volume to produce the desired nozzle injection velocity. A number of runs were made using this reactor system and the results thereof are set forth in the following table, Table 3. The temperature of the gallium arsenide source was 890–900° C. and the temperature of the deposition zone was approximately 795°±3° C.

TABLE 3

| Run No. orientation | Deposit time (min.) | Total gas flow (ml./min.) | HCl concentration (percent by vol.) | Transport rate (mgms. GaAs/min.) | Average growth rate (μ/min.) | Epitaxial film thickness (μ) |
|---|---|---|---|---|---|---|
| 1—(1-0-0) | 30 | 360 | 1.21 | 28.1 | 0.23 | 1—1.3 5—6.1<br>2—1.6 6—4.5<br>3—8.5 7—10.9<br>4—12.4 8—9.9 |
| 2—(1-0-0) | 60 | 184 | 1.28 | 15.1 | 0.14 | 1—19.4 5—10.2<br>2—0 6—2.4<br>3—0 7—0<br>4—5.4 8—4.3 |
| 3—(1-0-0) | 30 | 1,000 | 0.78 | 50.2 | 0.437 | 1—16.7 5—14.5<br>2—11.2 6—11.6<br>3—12.0 7—11.2<br>4—15.4 8—12.2 |
| 4—(1-0-0) | 30 | 1,000 | 0.78 | 39.7 | 0.444 | 1—Broken 5—12.7<br>2—13.3 6—16.2<br>3—11.7 7—15.6<br>4—Broken 8—10.7 |
| 5—(1-0-0) | 30 | 1,000 | 0.78 | 42.3 | 0.26 | 1—10.6 5—9.4<br>2—9.2 6—4.3<br>3—Broken 7—3.0<br>4—10.0 8—7.7 |

A removable stainless steel drive mechanism such as the type illustrated in FIG. 4 completes the reactor assembly. The substrate holder at the end of the drive rod was formed of quartz. The substrate holder was designed to hold 8 substrates with a maximum diameter of 20 mm. The angle of inclination of the wafers was 30° with respect to the vertical. The substrate holder was in the form of an octagonal pyramid of approximately 2.5 inches height with a diameter at the base of approximately 2.5 inches. However, in this example, the substrate holder was not rotated and the substrates were retained in a relatively motionless position.

The substrates are prepared according to the following procedure: Slices—15 mils thick—are cut from an X-ray oriented ingot. They are mounted on 3½ inch diameter No. 316 stainless steel polishing blocks using standard techniques with beeswax as the adhesive. Each block will hold approximately ten slices. They are next lapped on a John Crane Lapmaster–12 lapping machine using 3μ Microgrit obtained from the Geoscience Instrument Corp. Approximately 2.5 mils are removed in this operation. They are next polished on a Robinson-Houchin Twin-Bowl Polisher with Linde C abrasive and a Linde B abrasive for one hour each using Buehler Texmet No. 40–7666AB polishing pads. Approximately 0.5 mils are removed in this operation and the polished wafers have a mirror-like scratch-free surface to the naked eye. They are next chemically polished in a 16:1 solution of

EXAMPLE 3

This example employs an epitaxial deposition reactor constructed in accordance with the present invention and which is of the vertically disposed type. The reactor was substantially identical in all respects to the reactor employed in Example 2, with the exception that the substrate holder was rotated at approximately 12 r.p.m. The substrate holder was similarly identical to that employed in Example 2.

Eight wafers were disposed on the 8 sides of the substrate holders and reactions were conducted for a period of 60 minutes during each of the runs.

In this example, a slightly different reaction system was employed. A gallium reservoir was disposed in the reaction chamber and hydrogen chloride and pure hydrogen were admitted to the reaction chamber and passed through the gallium reservoir. The reactant gases were next passed into the mixing chamber and mixed with $AsH_3$ which was added to the mixing chamber.

The gas flow rate was maintained at 1000 milliliters per minute with a HCl concentration of 0.86% by volume and a $AsH_3$ concentration of 2.0% by volume. The velocity of the gas passing over the substrate was 22.6 centimeters per minute and the substrate temperature was 800° C.

After the epitaxial deposition reaction, infrared thicknesses were measured on each of the epitaxial layers of each of the wafers. The epitaxial layers were measured in 5 positions, namely, the top, the bottom, the left and right side margins and the center thereoff. These data are set forth in Table 4. Also set forth in Table 4 is the average thickness and the deviation from the average within each wafer and from wafer to wafer.

The second run using 8 additional wafers under the same reaction conditions was employed and the data for this run is set forth in Table 5 herein below.

TABLE 4

| Wafer No. | I.R. thickness (μ) Top | Center | Bottom | Left | Right | Avg. I.R. Thickness | Deviation from avg. percent Within wafer | Wafer to wafer |
|---|---|---|---|---|---|---|---|---|
| 1 | 15.9 | 14.7 | 15.2 | 14.9 | 15.2 | 15.18 | +4.75 / −3.15 | +3.97 |
| 2 | 15.2 | 14.4 | 14.6 | 14.8 | 15.0 | 14.80 | +2.70 / −2.70 | +1.37 |
| 3 | 15.1 | 14.0 | 14.6 | 14.5 | 14.4 | 14.52 | +4.20 / −3.58 | −0.55 |
| 4 | 14.3 | 13.4 | 13.3 | 13.3 | 13.4 | 13.53 | +5.69 / −1.73 | −8.02 |
| 5 | 14.3 | 12.8 | 13.5 | 13.2 | 13.7 | 13.50 | +5.42 / −5.18 | −7.53 |
| 6 | 15.0 | 13.8 | 13.5 | 13.3 | 14.7 | 14.05 | +6.76 / −5.34 | −3.76 |
| 7 | 16.1 | 15.1 | 15.5 | 15.2 | 15.9 | 15.55 | +3.54 / −2.90 | +6.50 |
| 8 | 16.3 | 14.9 | 15.9 | 15.7 | 15.4 | 15.65 | +4.15 / −4.79 | +7.19 |

Run Avg.=14.6μ.

TABLE 5

| Wafer No. | I.R. thickness (μ) Top | Center | Bottom | Left | Right | Avg. thickness | Deviation from avg., percent Within wafer | Wafer to wafer |
|---|---|---|---|---|---|---|---|---|
| 1 | 15.2 | 14.5 | 14.9 | 15.8 | 14.8 | 15.05 | +4.98 / −3.65 | +7.88 |
| 2 | 15.0 | 14.6 | 15.0 | 14.5 | 14.6 | 14.74 | +1.76 / −1.63 | +5.66 |
| 3 | 15.2 | 14.0 | 15.2 | 14.5 | 13.8 | 14.54 | +3.71 / −5.09 | +4.26 |
| 4 | 14.5 | 13.0 | 13.6 | 13.2 | 13.2 | 13.50 | +7.41 / −3.71 | −3.25 |
| 5 | 14.8 | 13.2 | 14.1 | 13.4 | 13.9 | 13.88 | +6.63 / −4.90 | −0.50 |
| 6 | 13.5 | 12.1 | 12.4 | 12.8 | 12.1 | 12.58 | +7.31 / −3.83 | −9.82 |
| 7 | 13.4 | 12.3 | 13.4 | 12.5 | 13.5 | 13.02 | +3.68 / −5.53 | −6.67 |
| 8 | 15.1 | 13.5 | 14.8 | 13.7 | 13.9 | 14.20 | +6.34 / −4.93 | +1.79 |

Run Avg.=13.95.

EXAMPLE 4

This example employs an epitaxial deposition reactor constructed in accordance with and embodying the present invention and which is of the horizontally disposed type. The procedure for preparing the substrates to be used in this example is similar to the procedure employed in Example 2. The reaction conditions employed in this example are also similar to the reaction conditions employed in Example 3. The reactor employed is substantiantially identical to the reactor employed in Example 3 with the exception of the substrate holder. The substrate holder used in this example contains a quartz rod with four radially offset axially extending forks for retaining a total of 8 substrates.

After the epitaxial deposition reaction, infrared thicknesses are measured on each of the layers of each of the wafers. The epitaxial layers are measured in 5 positions, namely, the top, the bottom, the left and right side margins and the center thereof. These data are set forth in Table 6. Also set forth in Table 6 is the average thickness and the deviation from the average within each wafer and from wafer to wafer.

TABLE 6

| Wafer No. | I.R. thickness (μ) Top | Center | Bottom | Left | Right | Avg. thickness | Deviation from avg., percent Within wafer | Wafer to wafer |
|---|---|---|---|---|---|---|---|---|
| 1 | 9.0 | 7.9 | 8.7 | 8.6 | 8.3 | 8.50 | +5.88 / −7.06 | −7.1 |
| 2 | 9.1 | 8.6 | 8.9 | 8.9 | 8.0 | 8.70 | +4.50 / −8.05 | −4.92 |
| 3 | 8.7 | 8.1 | 8.4 | 8.3 | 8.4 | 8.39 | +3.69 / −3.46 | −8.31 |
| 4 | 9.3 | 8.9 | 9.9 | 8.5 | 10.0 | 9.32 | +7.29 / −8.80 | +1.86 |
| 5 | 9.5 | 9.0 | 8.8 | 8.9 | 8.8 | 9.00 | +9.56 / −2.25 | −1.64 |
| 6 | 9.9 | 8.9 | 9.2 | 8.9 | 9.3 | 9.24 | +6.74 / −3.68 | +0.98 |
| 7 | 11.1 | 10.8 | ------ | ------ | 10.8 | 10.90 | +1.83 / −0.92 | +19.1 |
| 8 | 9.5 | 8.4 | 9.1 | 9.2 | 9.7 | 9.18 | +5.66 / −8.50 | +0.33 |

Run Avg.=9.15.

It should be understood that changes and modifications in the form, construction, arrangement and combination of parts presently described and pointed out may be made and substituted for those herein shown without departing from the nature and principle of my invention.

Having thus described my invention, what I desire to claim and secure by Letters Patent is:

1. The method of producing semiconductor materials by the epitaxial deposition of a film on a substrate, said method comprising:

(a) introducing an epitaxial reaction gas into a first zone formed by a first chamber, (b) maintaining the reaction gas in said first zone at a first temperature within the range of 400° C. to 1100° C., (c) introducing said reaction gas into a second zone formed by a second chamber, (d) introducing a dopant into said second zone and contacting said dopant with said reaction gas, (e) substantially raising the temperature of the reaction gas and dopant to a temperature within the range of 500° C. to 1200° C. and considerably above the temperature in said first zone, (f) causing a substantial lowering of the temperature of the gas and dopant in said second zone as the gas and dopant begin to leave said second zone, (g) passing said reaction gas and dopant therein from said second zone into an isothermal zone at a laminar flow rate, (h) moving said substrate in said isothermal zone with respect to the stream of gas and dopant passed into said isothermal zone, (i) lowering the temperature of the reaction gas and dopant in said isothermal zone to a temperature below that in said second zone and to a temperature in the range of 400° C. to 1100° C., (j) and causing the gas and dopant to move uniformly over the substrate thereby causing an epitaxial film from said gas to be deposited on the substrate located in said isothermal zone.

2. The method of producing semiconductor materials of claim 1 further characterized in that the epitaxial reactant gas mixture comprises combinations of Group III and Group V elements.

3. The method of producing semiconductor materials of claim 1 further characterized in that the path of gas flow in the deposition chamber is angularly shifted before deposition occurs on the substrate.

4. The method of producing semiconductor materials of claim 1 further characterized in that a plurality of substrates are located in the isothermal chamber and the surface of the substrates to receive the film is each located at 90° angles with respect to each other.

5. The method of producing semiconductor materials by the epitaxial deposition of a film on a substrate, said method comprising:

(a) introducing an epitaxial reaction gas mixture into a first zone, (b) passing said gas from said first zone into an isothermal zone at a laminar flow rate, (c) locating said substrate at an angle so that the surface of the substrate receiving the film is inclined with respect to the entering stream of gas mixture, (d) directing the gas mixture onto a point source causing the gas to spread out and to become angularly directed with respect to the gas mixture entering the isothermal zone, (e) moving said substrate in said isothermal zone with respect to the stream of gas passed into said isothermal zone, (f) and causing the gas to move uniformly over the substrate thereby causing the epitaxial film in said gas to be deposited on substrates located in said isothermal zone.

6. The method of producing semiconductor materials by the epitaxial deposition of a film on a substrate, said method comprising:

(a) introducing an epitaxial reaction gas into a first zone formed by a first chamber, (b) maintaining the reaction gas in said first zone at a first temperature within the range of 400° C. to 1100° C., (c) introducing said reaction gas into a second zone formed by a second chamber, (d) introducing a dopant into said second zone and contacting said dopant with said reaction gas, (e) substantially raising the temperature of the reaction gas and dopant to a temperature within the range of 500° C. to 1200° C. and considerably above the temperature in said first zone, (f) causing a substantial lowering of the temperature of the gas and dopant to said second zone as the gas and dopant begin to leave said second zone, (g) passing said reaction gas and dopant therein from said second zone into an isothermal zone at a laminar flow rate, (h) locating said substrate at an angle so the surface of the substrate receiving the film is inclined with respect to the entering stream of gas mixture in said isothermal zone, (i) directing the gas mixture onto a point source causing the gas mixture to spread out and become angularly directed with respect to the gas mixture entering the isothermal zone, (j) moving said substrate in said isothermal zone with respect to the stream of gas and dopant passed into said isothermal zone, (k) lowering the temperature of the reaction gas and dopant in said isothermal zone to a temperature below that in said second zone and to a temperature in the range of 400° C. to 1100° C., (l) and causing the gas and dopant to move uniformly over the substrate thereby causing an epitaxial film from said gas to be deposited on the substrate located in said isothermal zone.

7. The method of producing semiconductor materials by the epitaxial deposition of a film on a substrate, said method comprising:

(a) introducing a first gaseous reactant into a first zone formed by a first chamber, (b) maintaining the reactant in said first zone at a first temperature within the range of 400° C. to 1100° C., (c) introducing the first reactant into a second zone formed by a second chamber, (d) introducing a second gaseous reactant into the second zone and contacting the first gaseous reactant with the second gaseous reactant to form a reaction gas, (e) simultaneously introducing a dopant into said second zone along with said second gaseous reactant, (f) substantially raising the temperature of the reaction gas and dopant to a temperature within the range of 500° C. to 1200° C. and considerably above the temperature in said first zone, (g) causing a substantial lowering of the temperature of the reaction gas and dopant in said second zone as the gas and dopant begin to leave said second zone, (h) passing said reaction gas and dopant from said second zone into an isothermal zone at a laminar flow rate, (i) moving said substrate in said isothermal zone with respect to the stream of reaction gas and dopant passed into said isothermal zone, (j) lowering the temperature of the reaction gas and dopant in said isothermal zone to a temperature below that in said second zone and to a temperature within the range of 400° C. to 1100° C., and (k) causing the gas and dopant to move uniformly over the substrate thereby causing an epitaxial film from said gas to be deposited on the substrate located in said isothermal zone.

References Cited

UNITED STATES PATENTS

| | | | |
|---|---|---|---|
| 3,233,578 | 2/1966 | Capita | 117—106 |
| 3,301,213 | 1/1967 | Grochowski | 117—106 |
| 3,361,600 | 1/1968 | Reisman | 117—106 |

L. DEWAYNE RUTLEDGE, Primary Examiner

R. A. LESTER, Assistant Examiner

U.S. Cl. X.R.

117—106, 107.1, 107.2